United States Patent Office 3,558,202
Patented Jan. 26, 1971

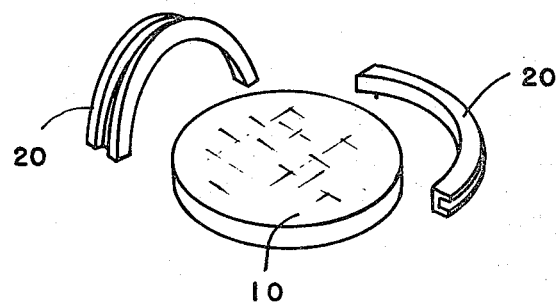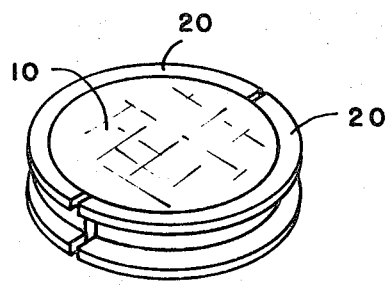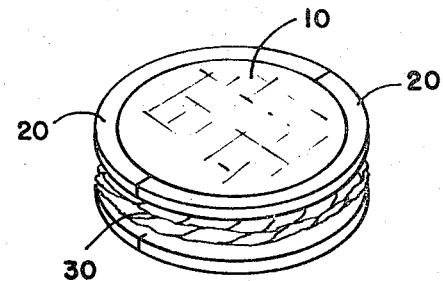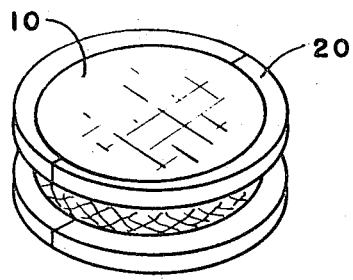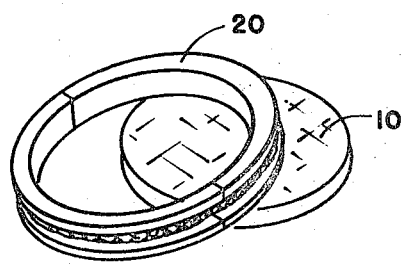

3,558,202
COMPOSITE BEARING AND PROCESS OF MANUFACTURE
Walter P. Lipscomb and Robert Z. Schreffler, Chester, Va., assignors to Allied Chemical Corporation, New York, N.Y., a corporation of New York
Filed Feb. 13, 1969, Ser. No. 799,023
Int. Cl. F16c 27/00
U.S. Cl. 308—238
10 Claims

ABSTRACT OF THE DISCLOSURE

A section of bearing surface material formed on a mandrel is wrapped on its outer side with multi-constituent yarn which is heated to produce fusion and shrinkage thereof whereby a composite bearing having the shape of the mandrel is produced.

BACKGROUND OF THE INVENTION

In many bearing selection problems, the cost and weight of the bearing is of primary importance. Cost of manufacture and maintenance which includes the lubrication system and replacement is also a prime factor in the total analysis. Bearing materials and particularly bearing surfaces, have always been an expensive problems, especially when it is considered that for any particular application the bearing material must be appropriately compatible with a given mating material. Other desired properties include suitable corrosion resistance, fatigue resistance, load carrying capacity, embeddability, conformability, and the like to meet the operating demands of the application for which it is chosen, such as speed, contamination, life required, temperature, lubrication available, and the like. For this reason certain select materials have been chosen over years of experience as preferred bearing surfaces. Thus, for compatible operation against steel shafts, the babbits and cadmium materials are rated highest. Other popular metals are the bronze and copper alloys and the more recent aluminum alloys.

Instead of making the bearing entirely from the specialized and expensive bearing materials mentioned, various proposals have arisen for composite bearing. That is, bearings especially designed to improve certain properties of the bearing, consisting, for example, of a low-carbon steel backing, an intermediate layer of copper, bronze, aluminum or silver, and an overlay of babbit ranging from 0.0005 to 0.005 inch thick. The intermediate layer increases the strength of the bearing and provides reasonably good compatibility in case the thin babbit surface layer is worn through in operation. These laminates have improved babbit bearings in load capacity and fatigue strength, leading to their frequent use in heavy-duty service in automobiles, trucks, aircraft, and gear units. However, these bearings are also relatively expensive in material and manufacturing costs. In manufacture, various procedures are employed, including continuously casting the bearing material on moving steel strip and then milling to size or by sintering an intermediate layer to a backing or adding a thin babbit overlay by precision casting or by plating. In any case, a considerable amount of precise work is involved.

SUMMARY OF THE INVENTION

This invention involves the production of novel bearing articles in a novel manner. In the preferred embodiment of the invention, a mandrel the shape of a desired bearing has a bearing surface material applied thereto. The latter is wrapped with a highly shrinkable filamentary material comprised of oriented polymeric films or filaments and the wrapped combination is subjected to heated conditions sufficient to shrink the polymeric material tightly about the bearing material on the mandrel thereby producing an article the shape of the mandrel. Various modifications are possible and contemplated as will be apparent to these skilled in this art from the appended claims and following description of the best mode of carrying out the invention and examples thereof, taken in connection with the accompanying drawing wherein:

FIGS. 1–5 represent a precision mandrel with materials applied in accordance with the method described herein, in progressive steps.

DESCRIPTION

The current best mode of carrying out the present invention is illustrated in FIGS. 1–5. In FIG. 1, a precision, circular mandrel 10 is shown adjacent a pair of thin metal, semi-circular channel members 20. The metal is any suitable bearing surface material. In FIG. 2 the channels are shown assembled loosely on the mandrel. In FIG. 3 the channels are shown containing an overwinding of multi-constituent filament yarn 30 and FIG. 4 illustrates the fused yarn after heat-treatment of the assembly of FIG. 3. FIG. 5 shows the mandrel 10 removed from the bearing.

Multi-constituent filament as used herein means filament made by inclusion of at least one film or filament-forming polymeric material in a matrix of another film or filament-forming polymeric material, the dispersion and matrix having different melt temperatures (at least 10° C.) an either optionally containing any secondary material compatible with the filament as a whole, and its end use such as reinforcing materials, fillers, antioxidants, or other additives useful in producing a particular property, as well as those useful in such processes as spinning, extruding, polymerization, fabric forming, shaping, heat-treating or other product finishings. For a complete, detailed description of the method of making multi-constituent filaments as well as various compositions thereof, reference is hereby made to Twilley U.S. Pat. 3,369,057, and copending U.S. patent application Ser. No. 727,327, filed May 7, 1968 for "Dimensionally Stable Articles and Method of Manufacture." The preferred high-shrinkage, filamentary material for this invention is comprised of polycaproamide and polyethylene terephthalate (70 and 30 parts by weight respectively) produced in accordance with Example 1 of said Twilley patent. Any polyamide and polyester can be employed however, ranging from 50–90 and 10–50 parts respectively, as described in the above referenced patent and application and other materials as described hereinafter.

As a specific example, an extruded U-shaped aluminum alloy channel was formed in the shape of two semi-circular ½ inch deep channels and positioned about a 5½ inch diameter mandrel. Since the channels will be forced very tightly about the mandrel, expensive machining or casting thereof is unnecessary. Only enough bearing metal to account for normal wear depth need be used, with a wound yarn of the type described forming the main body of the composite article. The latter has the advantage of reducing overall bearing weight and renders it highly resistant to shock fracture and vibrational fatigue failure. In addition, the nylon matrix, being adjacent the bearing metal surface, provides compatibility in case the latter wears out after an extended use.

Thereafter the mandrel and channels were placed on a shaft and the channels were wound full as shown in the drawing, with ½ inch thickness of 1125 denier/70 filament yarn under 200 grams winding tension. The yarn was comprised of a polycaproamide matrix having dispersed throughout 30 percent by weight fibrils of polyethylene terephthalate.

After winding the nylon/polyester yarn, the composite article was subjected to 250° C. temperature in a hot air oven for one hour to fuse and shrink the yarn. After cooling for an hour, the channel yarn bearing was removed from the mandrel. The result was a light-weight flanged bearing needing no further machining on the bearing surface, of the type commercially useful as small electric motor bearings, appliance shaft bearings, aircraft-space servo shafts (rotary or linear), aircraft movable surface bearings and guides, and linear or rotary motion guides for small to medium industrial machines of virtually any type, etc.

Heat-treatment of the nylon 6/polyester yarn at 250° C. is sufficient to melt and fuse the nylon matrix material and approaches the melting or softening point of the polyester, but does not destroy the microfibrillar structure thereof in the yarn. The heating conditions caused the yarn to shrink and build up a massive retractive force which formed the bearing metal precisely to the mandrel. The wound yarn became permanently fused in place as a body of polymer structure having hoop-strength value at least 25 percent greater than a fused structure comprised of a single polymer such as nylon.

Another bearing was prepared by wrapping a heavy wall section of copper tubing with 75/25 nylon 6/polyester yarn and fusing at 240° C. in an oven for 10 minutes. Constraining flanges were employed to restrict the wound yarn in the area desired. Thereafter the tubing was internally polished to remove roughness and the article was useful as a copper sleeve bearing.

Several other examples of composite bearings were made as follows. Thin brass sheets of 0.005 to 0.010 thickness were cut to approximate size and loosely wrapped around a precision mandrel. Some of the pieces of sheeting had one edge bent upward so as to form a facing flange on the final composite bearing. The loosely wrapped brass sheets were overwrapped with drawn polymeric yarns, of biconstituent nature, then the entire assembly exposed for 15 minutes to 240° C. air. Yarn shrinkage during heat exposure formed the brass so closely to the mandrel that only light polishing was necessary for the structures to be used as precision sleeve or flanged sleeve bearings.

Another advantage of the bearings of this invention is their ability to be replaced quickly and cheaply. In the case of the extruded channel-yarn bearing first described above, water was used to cool the assembly. The yarn absorbed sufficient moisture to expand the bearing to facilitate easy removal from the mandrel. However, after remaining at normal room conditions for a few hours, the relatively dry structure would not fit over the mandrel easily. The moisture expansion-contraction property of selected polymers can therefore be used to an advantage to fit low clearance assemblies more readily than usual, and if desired, the bearing in place can then be coated with a suitable moisture barrier. With an aluminum rod or other structure as a mandrel, the ability to easily remove the bearing in this manner is probably more dramatically illustrated due to the particularly good match of the thermal coefficient of expansion of aluminum to the fused polymer structure.

The foregoing examples illustrate variations of the invention, as where the mandrel is a tube of bearing metal and after fusion of the multi-constituent material thereto, serves as an inner bearing surface member. The bearing material may be supplied in any suitable manner so long as it is either the mandrel itself, an inner surface of a tubular mandrel intended to remain in the bearing, or a thin sheet, channel, or even molten or liquid coating applied to the mandrel and adapted to take on the shape thereof when wound with yarn and heat-treated. Although greater economies are realized with metal bearing surface materials, the invention contemplates use of others such as plastics and the like, where desirable.

As to chemical make-up, the multi-constituent filaments are prepared from a combination of polymeric materials, one of which is capable of acting as a low melting matrix in which a higher melting dispersion is created by suitable mixing. Polyester-polyamide combinations produce the most outstanding properties of any combination tested thus far. The compositions contain 50–90 parts by weight nylon 6 and 50–10 parts by weight of a polyester microfibrillar dispersion. Other particularly good materials in multi-constituents are polyolefins, polysulfones, polyphenyl oxides, polycarbonates, and other polyamides and polyesters. Examples of the most useful polyolefin materials are polyethylene, polypropylene, poly-1-butene, poly-2-butene, polyisobutylene and polystyrene. In addition to the preferred nylon 6 (polycaproamide), other suitable polyamides are nylon 6–10 (hexamethylene-diamine-sebacic acid), nylon 6–6 (hexamethylene-diamine-adipic acid), methanol- and ethanol-soluble polyamide copolymers and other substiuted poyamides such as the alkoxy-substituted polyamides. The preferred polyester is polyethylene terephthalate; others are polyesters of high $T_G$ useful in the practice of the present invention, including those polymers in which one of the recurring units in the polyester chain is the diacyl aromatic radical from terephthalic acid, isophthalic acid, 5-t-butylisophthalate, a naphthalene dicarboxylic acid such as naphthalene 2,6 and 2,7 acids, a diphenyldicarboxylic acid, a diphenyl ether dicarboxylic acid, a diphenyl alkylene dicarboxylic acid, a diphenyl sulphone dicarboxylic acid, an azo dibenzoid acid, a pyridine dicarboxylic acid, a quinoline dicarboxylic acid, and analogous aromatic species including the sulfonic acid analogues; diacyl radicals containing cyclopentane or cyclohexane rings between the acyl groups; and such radicals substituted in the ring, e.g., by alkyl or halo substituents.

As an example of a blend of two different materials in the same general class, a blend was prepared containing 30% polyethylene and 70% polypropylene by weight. Both were commercially available grades. The blend was spun using a 1-inch extruder having a 24 to 1 $L/D$ ratio. The spinning temperatures were 280–290° C.; a 20-hole spinnerette having a 0.020 mil diameter capillary with an $L/D$ ratio of 10 to 1 and a 20° entrance angle was used. After winding on a mandrel fusion should be carried out at 175–180° C. until completed.

In general, fusion should be carried out at temperatures beneath the melting point of the higher melting microfibrillar dispersion but at or above the melt temperature of the matrix material where multi-constituent structures are employed. The unique character of the multi-constituents enables the adjacent yarn elements to fuse together but without destroying strength and other beneficial properties, particularly that of the stronger polyester dispersion in the case of a polymer blend. Therefore the hoop-stress value is greater than in the case of nylon wound structures. It has been found that some polymer blends such as 70/30 nylon:polyester have hoop-stress values exceeding 5,000 pounds per square inch.

When bonding by heating to effect fusion, for any given polymer formulation, the fusion rate will differ depending on their physical properties, the amount of material to be fused, etc. Thus the temperature and extent of fusion cannot be critically defined except to the extent that fusion be carried out below the melting point of the higher melting polymer in the multi-constituent and for time sufficient to effect substantial shrinkage onto the bearing metal, but for less time than would cause excessive degradation of the yarn.

The invention may be embodied in other specific forms without departing from the essential characteristics thereof. The present embodiments are therefore to be considered in all respects as illustrative and not restrictive, th scope of the invention being indicated by the appended claims rather than by the foregoing description, and all

We claim:
1. A method for making a bearing from a heat shrinkable filamentary material wrapped upon a bearing surface material mounted on a mandrel or similar form, the improvement which comprises overwinding said surface material with filament comprises of at least two fiber-forming polymeric materials, one of which has a higher melting point than the other, to form a bearing assembly and subjecting said assembly to heated conditions sufficient to retract the filaments and fuse the lower melting polymeric material.

2. A method as described in claim 1 wherein the polymeric material is comprised of 50–90 parts by weight of a fiber-forming polymeric matrix material and 10–50 parts by weight of a higher melting microfibrillar dispersion therein, and said conditions are sufficient to effect fusion of a substantial portion of said matrix material together.

3. A method as described in claim 2 wherein said multiconstituent material is comprised of a polyamide matrix and a polyester dispersion.

4. A method as described in claim 3 wherein the multiconstituent material is heated to at least 240° C.

5. A method as described in claim 1 wherein the bearing assembly is cooled in a water bath to facilitate easier removal thereof from the mandrel.

6. A composite bearing comprising an internal tubular section of bearing surface material having oriented matrix-type filamentary material heat-shrunk and fused together in tight engagement with said surface material to form a composite bearing structure, said filamentary material being comprised of a fiber-forming matrix polymer having a fiber-forming polymer dispersed therein, said matrix polymer having a lower melting temperature than said dispersed polymer.

7. A composite bearing as described in claim 6 wherein the surface material consists of two semicircular U-shaped channels, said channels containing wound layers of fused multiconstituent filaments.

8. A composite bearing as defined in claim 6 wherein said polymeric material is comprised of 50–90 parts by weight of a fiber-forming polymeric matrix material and 10–50 parts by weight of a higher melting microfibrillar dispersion therein, said matrix material being at least partially fused together.

9. A composite bearing as defined in claim 8 wherein said polymeric material is comprised of a polyamide matrix and a polyester dispersed throughout said matrix.

10. A composite bearing as described in claim 9 wherein said polymeric material has a hoop-stress value of at least 2,500 pounds per square inch.

References Cited
UNITED STATES PATENTS

| | | | |
|---|---|---|---|
| 3,050,613 | 8/1962 | Sheinhartz et al. | 29—447 |
| 3,369,057 | 2/1968 | Twilley | 264—103 |
| 3,436,041 | 4/1969 | Haller | 264—230 |
| 3,458,374 | 7/1969 | Shobert | 308—238 |

OTHER REFERENCES

Biconstituent Fibers for Carpeting; Hayes; Chemical Engineering Process; October 1969, vol. 65, No. 10; pp. 50–54.

Aviation May 1945, p. 159.

FRED C. MATTERN, JR., Primary Examiner

W. S. RATLIFF, JR., Assistant Examiner

U.S. Cl. X.R.

264—103, 230